United States Patent [19]

Crookston

[11] 4,231,978

[45] Nov. 4, 1980

[54] HIGH DENSITY LOW POROSITY REFRACTORY PRODUCT AND PROCESS FOR MAKING THE SAME

[75] Inventor: James A. Crookston, Mexico, Mo.

[73] Assignee: A. P. Green Refractor, Mexico, Mo.

[21] Appl. No.: 15,855

[22] Filed: Feb. 26, 1979

Related U.S. Application Data

[63] Continuation-in-part of Ser. No. 666,032, Mar. 11, 1976, abandoned.

[51] Int. Cl.$^2$ .............................................. B29C 35/04
[52] U.S. Cl. ...................................... 264/63; 106/59; 264/140
[58] Field of Search .................. 264/56, DIG. 69, 138, 264/140, 63; 106/59

[56] References Cited

U.S. PATENT DOCUMENTS

| | | | |
|---|---|---|---|
| 2,639,993 | 5/1953 | Heuer | 106/59 |
| 3,522,065 | 7/1970 | Herron | 106/59 |
| 4,125,407 | 11/1978 | Veho | 106/59 |
| 4,169,734 | 10/1979 | Brenzy | 106/59 |

*Primary Examiner*—John A. Parrish
*Attorney, Agent, or Firm*—Gravely, Lieder & Woodruff

[57] ABSTRACT

A refractory shape having high density, low porosity, and small median pore size is formed from very fine grain refractory material, specifically finely milled periclase and chrome ore, by tempering the fine materials with a chemical bonding solution, specifically magnesium chloride and/or magnesium sulfate, combining the tempered fine material into larger size agglomerated pieces, drying and crushing the agglomerated pieces, grade sizing the crushed agglomerated pieces into fractions of varying size gradation, compounding a mix suitable for forming a shape by mixing the fractions in proper proportions, moistening the mix, and pressing it into the desired refractory shape. The refractory shape is then dried and fired to form a ceramic bond.

6 Claims, No Drawings

HIGH DENSITY LOW POROSITY REFRACTORY PRODUCT AND PROCESS FOR MAKING THE SAME

REFERENCE TO PRIOR APPLICATION

This application is a continuation-in-part of my prior application Ser. No. 666,032 filed Mar. 11, 1976 now abandoned.

BACKGROUND OF THE INVENTION

This invention relates in general to refractory products and processes and more particularly to a high density, low porosity refractory product made substantially from very fine materials and to a process for making the same.

In refractory shapes, particularly refractory brick, it is desirable to have high density and low porosity, and all processes for producing these refractories strive for that end, with the exception of insulating firebrick which are characterized by low density and high porosity. The conventional dry press process produces a brick which is suitable for many refractory purposes. Nevertheless, conventional dry pressed brick possess a lower than desired density and a higher than desired porosity. Conventional dry pressed brick also have a relatively high number of large pores, which is undesirable.

More specifically, the manufacture of refractory brick by the dry press process normally involves using a size graded mix of coarse, intermediate and fine sized particles. A typical screen analysis of such a brick mix is:

| | |
|---|---|
| Pass 4 mesh and retained on 10 mesh | 25% |
| Pass 10 mesh and retained on 28 mesh | 20% |
| Pass 28 mesh and retained on 65 mesh | 10% |
| Pass 65 mesh | 45% |

The use of such a size graded mixture allows the brick to be pressed to a reasonably high density without forming laminations in the brick perpendicular to the direction of pressing. If too high a proportion of the mixture is composed of the fine fraction ($-65$ mesh), there is a tendency for the mixture to contain entrapped air during pressing. This entrapped air is compressed during pressing, and, when the pressure is released, the air expands and causes highly undesirable laminations in the brick. These laminations tend to be further accentuated when the bricks are subjected to high temperatures during the firing process.

While the use of the size graded mixture allows forming solid brick free of laminations, such a mixture gives relatively low density and high porosity to the brick. Using the foregoing typical size gradation, there are limits to the values of density and porosity attainable.

It is further generally recognized that in addition to the amount of pores present in a refractory brick the size of the pores is important, with the smallest size possible generally being most desirable. When the foregoing typical gradation is used for a refractory body, the pore sizes resulting cover a wide range with an appreciable proportion of the pores being of large size, i.e., on the order of 10 to 40 microns in diameter.

It is possible to improve the density, porosity, and size of pores developed in a refractory body by using a fine grained mixture. Herron, U.S. Pat. No. 3,522,065 discloses the use of finely milled raw materials to improve properties in direct bonded magnesia-chrome refractories. The patent does not reveal a method of manufacturing refractory pieces of a useful commercial size from the fine raw materials without cracking. Cracking may be minimized by means of isostatic forming. Following is a procedure typical of one form of an isostatic process:

(a) A mixture of finely divided raw materials is vibration packed into a rubber mold which is sealed and contained in a perforated metal container;
(b) The mold and container are placed into a high pressure vessel;
(c) The refractory material in the mold is exposed to a high pressure in the vessel by means of a fluid, such as oil or water, which is pumped into the vessel to exert pressures up to 50,000 psi on the mold; and
(d) The refractory material is formed into an object which assumes the shape of the mold.

By exerting pressure on the body in this fashion, the air normally entrapped in the fine grained body is removed before it can cause pressure laminations to form. Also, the pressure is exerted equally on all surfaces of the shape or refractory body. This method of pressure application produces a shape practically free of the stresses normally formed in a body which is exposed to forming pressures exerted primarily in one direction. Following forming, it is sometimes necessary to dress the shape in the green state before it is exposed to high temperature firing.

The isostatic forming process necessitates the use of equipment and processes not common to the refractories industry, e.g., isostatic pressure application, green finishing, etc. This, in turn, leads to the need for a separate plant to manufacture products by this process. Also, the isostatic process is a much more expensive manufacturing procedure than the conventional dry press process. This is particularly true when conventional size pieces or shapes are being manufactured. However, the isostatic process is ideal for forming large pieces weighing several hundreds of pounds and having the highly desirable properties of high density, uniformity, low porosity, and high strength.

Thus, while isostatic forming allows the manufacture of high strength, high density, and low porosity refractories from fine grain bodies by pressing, the isostatic process is characterized by the need for new processing plants and high manufacturing costs.

Another method of making a magnesia-chrome refractory from finely milled dead burned magnesite and chrome ore was described by I. S. Kainarskii et al. (OGNEUPORY, No. 1, pp 32–37, January 1972) where the finely milled raw materials were mixed, moistened with sulfite lye and then pressed into briquettes. After drying the briquettes were crushed and screened into fractions. These fractions were blended and moistened with sulfite lye prior to pressing into brick. It was found, however, that green brick prepared in this manner developed cracks during drying as a result of hydration of the fine periclase. To eliminate the cracking it was necessary to prefire the briquettes at 1100°–1300° C. The necessity of costly prefiring the briquette is a disadvantage of the Kainarskii process. Applicant avoids the problem of cracking of the final shape by tempering the fine grains with a chemical bonding solution. Also, the use of high purity hydration resistant periclase also aids in avoiding this problem when an MgO basic brick is being made. The high purity hydration resistant periclase contains little CaO and SiO$_2$ and shows little hydration when tested by ASTM T544.

Singer in an article entitled "Humid—Pressing and Dry-Pressing of Porcelain and Steatite", The British Clayworker, Vol. 61, p. 242–246, November 1952, forms "bricks" from finely ground material and regranulates these to form particles large enough to exactly fill a die in a dry pressing operation.

While other examples of the preparation and use of dense granules of various materials as a precursor to dry pressing ceramics can be found in technical literature, the art of using dense granules without costly prefiring in the manufacture of dry pressed dense commercial basic refractories has not been described.

SUMMARY OF THE INVENTION

One of the principal objects of the present invention is to provide a process which utilizes conventional processing equipment for manufacturing a refractory brick or other shape having greater strength, higher density, and lower porosity than refractory bricks made by conventional dry pressing processes. Another object is to provide a process of the type stated which may be performed in manufacturing facilities which produce conventional refractory brick. A further object is to provide a process of the type stated which is simple and economical. An additional object is to provide refractory bricks or shapes which have functional characteristics similar to refractory products produced by an isostatic forming process. Yet another object is to provide a process of the type stated which results in a refractory product that is free of pressure laminations and other detrimental cracks. These and other objects and advantages will become apparent hereinafter.

The present invention is embodied in a process for manufacturing a refractory product, which process comprises agglomerating extremely fine refractory materials into discrete particles and forming the particles into a brick mix which is pressed into the desired refractory shapes and fired. The invention further resides in the refractory products themselves.

The following table provides the ranges of properties that may be obtained by this process for a 60% MgO basic brick.

| RANGE OF PROPERTIES OF 60% MgO BASIC BRICK MADE BY THE PREDENSIFICATON PROCESS | |
|---|---|
| Bulk Density | 190–220 pcf |
| Apparent Porosity | 7.0–18.0% |
| Modulus of Rupture | 1400–2600 psi |
| 2700° F. MOR | 700–1100 psi |
| Median Pore Size | 2.5–8.0 microns |

DETAILED DESCRIPTION

Broadly speaking, the process of the present invention involves agglomerating or forming a very fine grained mixture of refractory materials into larger particles prior to size grading and dry pressing the larger refractory aggregates or particles into a desired refractory shape by application of unidirectional pressing force. This pretreatment inhibits the formation of laminations perpendicular to the direction of the pressing force in the final product. Any agglomerating or preforming technique is acceptable provided the agglomerates formed thereby are sufficiently hard and strong to withstand subsequent processing steps, such as crushing and screening, batching, mixing, tempering and pressing. With all preforming techniques, the preformed shape is normally dried to develop its strength and then the preformed shape is crushed into particles of desirable brick forming sizes.

All known refractory materials are amenable to treatment according to this process, including chrome ores, magnesite, periclase, alumina, bauxities, fireclays, zircon, zirconia, etc. Any acid, basic, or neutral refractory material may be used in the practice of this invention. In the case of basic refractories, however, certain precautions must be taken to obtain brick which are dense but yet sufficiently free of cracks so as to be of commercial value.

Before presenting specific examples of this invention, a general description of its practice, including the various modifications of its preferred practice, is presented. For illustrative purposes and to aid in clarifying the description, a manufacturing flow sheet depicting the Predensified Grain Brick Process is presented hereinafter.

PREDENSIFIED GRAIN BASIC BRICK PROCESS

Preferred Method

Periclase and Chrome Ore or Concentrates (Any Combination)

Co-Ball Mill to −325 Mesh With an Average Sub-Sieve Particle Size of 3 to 4 Microns Batch the Mix Composed of 80% of the Ball Milled Mixture and 20% of −65 Mesh Periclase and −65 Mesh Chrome Ore In the Same Ratio as the Ball Mill Charge Temper With A Bond Salts Water Solution Composed of 1% MgSO$_4$.7H$_2$O and 1% MgCl$_2$.6H$_2$O Briquette at 40,000 psi in Briquette Rolls Dry Briquettes at 350°–400° F. For at Least 1 Hour in a Shaft Dryer Crush Briquettes to 3 Mesh and Fines Using Any Equipment Suitable for Crushing and Then Screen Into Desired Fractions Blend and Temper the Desired Fractions With Bond Solution Described Above for Briquettes or With an Aqueous Solution of an Organic Bond Press Brick at 11,000 psi Dry Brick at 250°–400° F. For at least 8 Hours Burn Brick at 3200° F. for 10 Hours Using a Heating and Cooling Schedule of 50° F./Hour Periclase or deadburned magnesite and chrome ore are the principal ingredients of basic refractories, although other minor additives are sometimes used with these materials, such as fume silica, alumina, chromic oxide, olivine, etc.

It is preferred to use a hydration resistant periclase as it has been found that non hydration resistance periclase sometimes hydrates during the brick making process leading to the formation of cracks in the brick. By hydration resistant is meant a periclase that shows only a few percent hydration when tested by ASTM C544 or similar test. Adequate hydration resistance is developed by fully dead burning periclase that has a lime to silica ratio of about one or less.

The periclase and chrome ore ingredients may be used in any proportion in the practice of this invention. The chosen mixture, which is to be formed into larger pieces (which themselves are to be crushed) in the practice of this invention, is composed of finely divided particles of periclase and chrome ore. The finely divided mixture may be prepared by crushing and ball milling the properly proportioned mixture together (co-ball milling). This is the preferred method. An alternate method which may be used is to mill the ingredients separately to the desired degree of fineness, and then to combine them in the desired proportions. The degree of fineness of the mixture will affect the properties of the final product but may be as coarse as 65 mesh or as fine as 325 mesh or finer. The preferred fineness is 325 mesh with an average sub-sieve size of about 3 to 4 microns. This is true whether the materials are co-ball milled or milled separately.

When the desired fineness of the ball milled material has been achieved, an addition of 65 mesh or coarser periclase and chrome ore may be added for the purpose of controlling the shrinkage during burning. Brick made from a mixture of fines and 65 mesh or coarser materials are more resistant to craze and edge cracking on firing and can withstand a faster firing schedule than brick made of all fines. In the preferred method, a 20% addition of 65 mesh periclase and/or chrome ore is made to the mix, prior to forming into agglomerates, but may also be added to the final brick mix instead.

This mixture is then mixed and tempered with water and a bonding agent. The preferred bond is a water solution of 1% $MgSO_4.7H_2O$ and 1% $MgCl_2.6H_2O$, based on the weight of the mixture being bonded. However, either of these salts alone or in amounts greater or smaller than the preferred quantities may be used. Also, other bonding agents such as sulfuric acid, hydrochloric acid, other sulphate or chloride salts, etc., may be used. The bond selected, however, must provide agglomerates of the fine mixture having adequate hardness and strength to withstand the subsequent processing required in the practice of this invention. It is believed that the foregoing bonding agents also stabilize the fine magnesia particles against hydration which would be detrimental later in the process after the final brick shapes have been pressed. While this mechanism of stabilization is not fully understood, it is believed that the finest and most hydration-prone magnesia particles and the larger periclase grains react with water and the bonding agents to form strong, water insoluble, hydraulic cementatious phases. In the case of $MgSO_4.7H_2O$ the following reactions are thought to be involved;

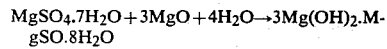
$MgSO_4.7H_2O + 3MgO + 4H_2O \rightarrow 3Mg(OH)_2.MgSO.8H_2O$ and

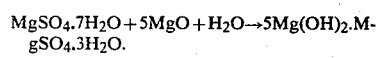
$MgSO_4.7H_2O + 5MgO + H_2O \rightarrow 5Mg(OH)_2.MgSO_4.3H_2O$.

In the case of $MgCl.6H_2O$ the following reactions are thought to be involved:

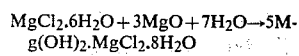
$MgCl_2.6H_2O + 3MgO + 7H_2O \rightarrow 5Mg(OH)_2.MgCl_2.8H_2O$ and

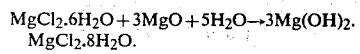
$MgCl_2.6H_2O + 3MgO + 5H_2O \rightarrow 3Mg(OH)_2.MgCl_2.8H_2O$.

The above reaction products have been known and used for architectural purposes for many years because of their durability and other useful properties. Use of bonding materials with hydrophilic or humectant qualities, such as carbohydrates or lignosulfonates, in the agglomerates may result in troublesome hydration later in processing. The amount of liquid used to temper the mixture must be sufficient to give the mixture the consistency required to form the desired agglomerates.

The tempered mixture is then formed into agglomerates or predensified granules of the fine mixture. These agglomerates or predensified granules may be formed by several means, such as by extruding into pellets which would require a relatively high water content and bond content, agglomerating in a mixer which would generally give relatively soft agglomerates, pressing into bricks or dobies on a toggle or hydraulic press, briquetting with briquette rolls, etc. Of the various possible methods for agglomerating or predensifying the fines, the use of briquette rolls is preferred, in which briquettes of almond shape about $1'' \times \frac{3}{4}'' \times \frac{1}{2}''$ in size are formed under a pressure of approximately 40,000 psi. The second preferred method is forming dobies of about $9'' \times 4\frac{1}{2}'' \times 2\frac{1}{2}''$ size on a hydraulic or toggle press under a pressure of approximately 10,000–15,000 psi.

The method of forming the predensified granules influences the hardness, strength, and density of the granules which in turn influences the behavior of the brick made from the granules and their properties. The harder and more dense the granules the less will be the shrinkage upon firing of the brick made from the granules. This will be illustrated in the specific examples which follow.

After forming the briquettes, dobies, or agglomerates, they are dried at a sufficient temperature for a sufficient length of time to effect complete drying and to develop the optimum strength from the bond added to the mixture as elevated temperatures accelerate the above mentioned reactions.

Drying may be accomplished in a batch dryer, a tunnel dryer, or a shaft dryer in the case of the briquetted material. The preferred method for briquettes is to use a shaft dryer, exposing the briquettes to a temperature of 350° F.–400° F. for a period of at least one hour, although somewhat higher temperatures (300°–800° F.) or longer times may be used. In a shaft dryer the briquettes can be more readily exposed to both the temperature and the flow of hot air, thus reducing the time required to effect the necessary drying and development of bond strength. In the cases of using a batch dryer or a tunnel dryer, it is more difficult to effect the transfer of heat from the dryer to the briquettes or dobies. Therefore, in the batch and tunnel dryer techniques, a temperature of 350° F.–400° F. or somewhat higher is applied for at least 8 hours. In any case, regardless of the method used to dry the briquettes or dobies, the temperature and time of drying must be sufficient to completely dry them and develop their optimum strength.

After drying, the briquettes or dobies or other agglomerates of the fine mixture are crushed in suitable equipment to provide predensified grains of the proper grain sizing for making dry pressed brick. The grain sizing for making dry-pressed brick is as follows:

|  | Preferred | Range |
|---|---|---|
| Pass 3 mesh on 10 mesh | 60% | 40 to 60% |
| Pass 10 mesh on 28 mesh | 0% | 0 to 20% |
| Pass 28 mesh | 40% | 30 to 60% |

This preferred brick mix grain sizing, or any other grain sizing that may be desired, may be achieved by screening the crushed agglomerates into the required fractions and recombining these fractions in the desired proportions.

If an addition of 65 mesh or coarser periclase and chrome was not made to the briquette mix, these materials may be added to the brick mix otherwise consisting of the crushed predensified fines. If the addition is to be made to the brick mix, the sized fractions of the crushed predensified fines must be prepared to allow the 65 mesh materials to be accomodated and still retain good pressing characteristics.

The fractions of predensified grain and other raw material fractions, if added, are then mixed and blended and tempered with water and with bonding agents if desired. In the preferred method, a thick aqueous solution of an organic bond such as dextrin is used. Preferably, the mix is dry mixed 1 minute and then wet mixed or tempered for three minutes. However, the times for dry and wet mixing may be varied from the preferred method, as long as the mix is thoroughly mixed and tempered. A mixer with mullers can be used, but with the mullers raised above the pan bottom, to avoid excessive breakdown of the predensified granules.

The tempered mix is discharged from the mixer and conveyed by suitable means to a press where the brick are formed. Any type of press may be used which is capable of forming the brick to the optimum pressed density. The preferred method of forming is by use of a hydraulic or mechanical press using a forming pressure of 5,500 to 11,000 psi. However, other pressures may be used provided the brick formed are capable of being handled after pressing and do not contain laminations or pressure cracks due to excessive forming pressure.

After forming, the pressed brick are dried, depending on the bonding agent, from 250° F. to 400° F. for at least 8 hours. However, the criteria for selecting the drying conditions are that the brick be sufficiently dry to avoid cracking when exposed to high temperatures in firing and to possess sufficient strength to withstand handling in the case where the brick are transferred from the dryer cars to tunnel kiln cars or to a periodic kiln. When the pressed brick are set directly from the press to tunnel kiln cars or to periodic kiln cars, the requirement is then reduced to sufficient drying to avoid cracking in firing.

After drying the brick are set to tunnel kiln or periodic kiln cars, assuming they are not directly set to the tunnel kiln or periodic kiln cars after pressing, for firing. The preferred method of firing or burning the brick is to heat and cool the brick at a rate of about 50° F. per hour using a top temperature of 3200° F. and holding the brick at the top temperature for 10 hours. However deviations from this preferred method of firing the brick can be used which will, within limits, provide brick of somewhat improved properties.

Moving from the general description of the process and products derived from it, specific examples are now given in detail to illustrate the practice of the invention, the benefits to be derived from it, and the effects of varying the processing parameters as described previously.

EXAMPLE NO. 1

In this example a basic refractory having a normal MgO content of 60% was made using a combination of 50% Philippine chrome ore concentrates (−10 mesh) and 50% of a high purity sea-water periclase grain pre-crushed to −10 mesh and fines. The characteristics of these materials were as follows:

| Chemical Analysis | Philippine Chrome Ore | Periclase |
|---|---|---|
| MgO | 15.4% | 98.2% |
| CaO | 0.29 | 0.67 |
| $SiO_2$ | 2.93 | 0.76 |
| $Al_2O_3$ | 29.5 | 0.16 |
| $Fe_2O_3$ | 14.6 | 0.17 |
| $Cr_2O_3$ | 34.1 | Tr. |
| Bulk Specific Gravity, g/cc | 3.84 | 3.33 |
| True Specific Gravity, g/cc | 3.98 | 3.56 |

The chrome ore and periclase were ball milled together to several degrees of fineness; i.e., minus 65 mesh, minus 150 mesh, and minus 325 mesh.

Each co-ball milled mixture was mixed with a water solution of 1% $MgCl_2.6H_2O$ and 1% $MgSO_4.7H_2O$, based on the dry weight of the mixture. The dampened mixtures were then formed at about 40,000 psi on Komarek-Greaves briquetting rolls into almond shaped briquettes. These briquettes were then dried at 350° F. for about 16 hours in a batch dryer until the briquettes were dry and hard.

After drying each of the types of briquettes were crushed and sized to give a normal brick making grain-sized mixture approximately as follows:

| Pass 3 on 10 mesh | 25% |
|---|---|
| Pass 10 and 28 mesh | 20 |
| Pass 28 and 65 mesh | 10 |
| Pass 65 mesh | 45 |

Each of these grain-sized mixtures was then mixed in a muller-type mixer with the mullers raised and with sufficient water to give the mix a suitable dry pressing consistency. These mixes were then formed into brick on a hydraulic press using a forming pressure of 11,000 psi. No laminations or pressure cracks were evident in the pressed brick.

The formed brick from each mix were then dried in a batch dryer for about 24 hours at 350° F. The dried brick were set and fired in a gas-fired periodic kiln at 3150° F. for 10 hours using a heating and cooling rate of about 50° F. per hour.

After cooling, the brick from each mix were tested and examined. No laminations were evident in the fired brick although some crazing and edge cracking was noted. The brick properties are given in Table I along with properties usually obtained on brick of similar composition but made using normal dry press brick-making techniques and to properties usually obtained on brick of similar composition but made by the isostatic forming process.

TABLE I

| | A | B | C | Isostatic Process | Conventional Dry Press Process |
|---|---|---|---|---|---|
| MgO Content Mix: | | | ---- 60% ---- | | |
| Agglomerate A | 100% | | | | |
| Agglomerate B | | 100% | | | |
| Agglomerate C | | | 100% | | |
| Water | | --- 4% --- | | | |
| Firing Temperature | | --- 3150° F. --- | | | |
| Manufacturing Shrinkage | 7.4% | 5.9% | 3.1% | | |
| Bulk Density, pcf | 216 | 203 | 194 | 212 | 189–195 |
| Modulus of Rupture, psi | 2315 | 1405 | 1685 | 5000 | 600–900 |
| Hot Modulus of Rutpure, 2700° F., psi | 1020 | 895 | 740 | | |
| Apparent Porosity | 7.5% | 13.5% | 17.2% | 8.5% | 16–19% |
| Apparent Specific Gravity, g/cc | 3.74 | 3.76 | 3.78 | 3.72 | 3.71–3.75 |
| Median Pore Size, Microns | 2.7 | 6.2 | no Data | 1.8 | 18.8 |

Agglomerate A - Briquetted co-ball milled −325 mesh mixture of 50% periclase and 50% chrome ore concentrates.
Agglomerate B - Briquetted co-ball milled −150 mesh mixture of 50% periclase and 50% chrome ore concentrates.
Agglomerate C - Briquetted co-ball milled −65 mesh mixture of 50% periclase and 50% chrome ore concentrates.

As may be seen, as the fineness of the predensified materials decreases, the density and strength decreases and the porosity and pore size increases. The brick made by this invention using −325 mesh material have superior properties to conventional dry pressed brick and properties approaching those of isostatically formed brick.

EXAMPLE NO. 2

When brick are made from all predensified fine material according to this invention, they undergo the highest amount of shrinkage on firing. This sometimes results in brick having some surface craze cracking and edge cracking, which is probably due to heating them on a schedule too fast to accomodate the high shrinkage. While the cracking is confined to the surface with the interior of the brick being sound and crack free, this surface and edge cracking may be considered at times to be objectionable.

It was found that one method for eliminating this cracking or reducing it to an acceptable minimum, aside from slower firing schedules, was to increase the grain size of the mixtures to be briquetted; i.e., by increasing the grain size from the preferred −325 mesh size to −150 mesh or −65 mesh sizes. However, as seen from the data given in Table I, increasing the grain size in this manner resulted in decreased density and increased porosity, and lower strengths.

In this example, another method of eliminating or reducing the surface crazing and edge cracking is described. A basic refractory having a nominal MgO content of 60% was made in the same manner as described in Example 1 using the −325 mesh co-ball milled mixture. In addition, another basic refractory of similar composition was made, but in this case, 85% of the brick mix was composed of granules of the predensified briquette fines and 15% of the brick mix was composed of 7.5% of −65 mesh chrome ore concentrates and 7.5% of −65 mesh periclase. All other aspects of the manufacture of the brick of this second basic refractory were the same as described in Example 1. The properties of the brick made by these two techniques are given in Table II.

As may be seen from these data, adding the −65 mesh periclase and chrome ore decreased density and manufacturing shrinkage and increased strength, porosity, and pore size.

TABLE II

| | | |
|---|---|---|
| MgO Content Mix: | --- 60% --- | |
| | A | A-1 |
| Agglomerate A | 100% | 85% |
| Periclase, −65 mesh, ball milled | | 7.5 |
| Chrome ore concentrates, −65 mesh ball milled | | 7.5 |
| Water | --- 4% --- | |
| Firing temperature | --- 3150° F. --- | |
| Manufacturing Shrinkage | 7.4% | 6.9% |
| Bulk Density, pcf | 216 | 210 |
| Modulus of rupture, psi | 2315 | 2640 |
| Hot Modulus of rupture, 2700° F., psi | 1020 | 1315 |
| Apparent porosity | 7.5% | 10.2% |
| Apparent specific gravity g/cc | 3.74 | 3.75 |
| Median Pore size, microns | 2.7 | 7.6 |

EXAMPLE NO. 3

While briquetting is the preferred method of predensifying the fine mixtures, it is also possible to use other methods while still obtaining the desired improvement in brick properties. In this example, the predensification of the fines was accomplished by forming dobies or brick on a hydraulic press at about 15,000 psi. The dobies were made of the −325 mesh mixture described in Example 1 and were dried and processed into brick in the same manner as described for briquettes in that example. The brick properties thus obtained are given in Table No. III along with comparative properties for the brick made using the briquetting process.

TABLE III

| | | |
|---|---|---|
| MgO Content Mix: | --- 60% --- | |
| | A | A-2 |
| Agglomerate A | 100% | |
| Agglomerate A-2 | | 100% |
| Water | --- 4% --- | |
| Firing Temperature | --- 3150° F. --- | |
| Manufacturing Shrinkage | 7.4% | 8.4% |
| Bulk Density, pcf | 216 | 216 |
| Modulus of Rupture, psi | 2315 | 2880 |
| Hot Modulus of Rupture, 2700° F., psi | 1020 | 1020 |
| Apparent Porosity | 7.5% | 7.4% |
| Apparent Specific Gravity, g/cc | 3.74 | 3.74 |

Agglomerate A - Same as in Table I.
Agglomerate A-2 - Same as A, but predensified by forming dobies.

As may be seen from the data, aside from increased manufacturing shrinkage these mixes had comparable properties.

EXAMPLE NO. 4

The preferred method for preparing the fine mixture prior to predensification is to co-ball mill the ingredients. However, separate milling is also permissible. In this example, brick were made using −150 mesh material which was in one case co-ball milled and in the other case the ingredients were separately milled. In both cases, the brick were of 60% MgO content as described in Example No. 1. All other aspects of manufacture of these brick were the same as previously described. The properties of brick made by these two procedures are shown in Table IV.

TABLE IV

| MgO Content | --- 60% --- | |
|---|---|---|
| Mix: | B | B-1 |
| Agglomerate B | 100% | |
| Agglomerate B-1 | | 100% |
| Water | --- 4% --- | |
| Firing Temperature | --- 3150° F. --- | |
| Manufacturing Shrinkage | 5.9% | 6.9% |
| Bulk Density, pcf | 205 | 204 |
| Modulus of Rupture, psi | 1405 | 1725 |
| Hot Modulus of Rupture, 2700° F., psi | 895 | 575 |
| Apparent Porosity | 13.5% | 13.7% |
| Apparent Specific Gravity, g/cc | 3.76 | 3.76 |

Agglomerate B - Same as in Table I.
Agglomerate B-1 - Same as Agglomerate B, except the −150 mesh materials were separately milled.

As may be seen from the data, the properties of these two mixes were essentially comparable.

EXAMPLE NO. 5

The preferred firing temperature for these brick is 3200° F. However, improved properties are also obtained at the somewhat lower temperatures of 3000° F., 3050° F., and 3150° F. Table V gives the properties of brick fired at these three temperatures using the 60% MgO mixture of briquetted −325 mesh materials which were co-ball milled. All other aspects of their manufacture were as described in Example No. 1.

TABLE V

| MgO Content | ---- 60% ---- | | |
|---|---|---|---|
| Mix: | A | A-3 | A-4 |
| Agglomerate A | 100% | 100% | 100% |
| Water | ---- 4% ---- | | |
| Firing Temperature | 3150° F. | 3050° F. | 3000° F. |
| Manufacturing Shrinkage | 7.4% | 7.0% | 6.6% |
| Bulk Density, pcf | 216 | 208 | 208 |
| Modulus of Rupture, psi | 2315 | 2175 | 2315 |
| Hot Modulus of Rupture, 2700° F., psi | 1020 | 645 | 760 |
| Apparent Porosity | 7.5% | 9.3% | 11.1% |
| Apparent Specific Gravity, g/cc | 3.74 | 3.75 | 3.75 |

Agglomerate A - Same as in Table I.

These data show that as the firing temperature decreases, porosity increases and density and hot strength decrease.

EXAMPLE NO. 6

In addition to making brick using all fine materials as described in the previous examples, it was found that additions of predensified granules of −325 mesh fine materials to a normal brick mix of a 60% MgO type product resulted in improved properties. In this example, predensified granules of co-ball milled −325 mesh materials were crushed to −3 mesh and fines and were then added to a normal brick mix in increasing amounts as shown in Table VI. As may be seen, as the amount of predensified granules in the mix increased, the density increased and the porosity decreased.

TABLE VI

| Mix: | D | E | F | G |
|---|---|---|---|---|
| Periclase Pass 4 mesh and retained on 65 mesh, % | 30 | 22.5 | 15 | 7.5 |
| Ball milled and passing 65 mesh | 25 | 18.75 | 12.5 | 6.25 |
| Chrome Ore Concentrates Pass 10 mesh and retained on 65 mesh | 25 | 18.75 | 12.5 | 6.25 |
| Ball milled and passing 65 mesh | 20 | 15 | 10 | 5 |
| Agglomerate B, (Table II), 3 mesh and fines | 0 | 25 | 50 | 75 |
| Water | — | 4% | — | — |
| Firing Temperature, °F. | — | 3150° F. | — | — |
| Manufacturing Shrinkage | +0.75% | +0.25% | −1.3% | −3.5% |
| Bulk density, pcf | 182 | 185 | 190 | 195 |
| Modulus of rupture, psi | 515 | 550 | 675 | 1210 |
| Hot modulus of rupture, 2700° F., psi | 735 | 455 | 445 | 580 |
| Apparent porosity | 22.5% | 20.6% | 18.7% | 16.7% |
| Apparent specific gravity | 3.76 | 3.74 | 3.75 | 3.76 |

EXAMPLE NO. 7

A wide variety of compositions can be made using the predensified grain brick process. Table VII illustrates properties of brick made in nominal 30% MgO and 80% MgO compositions and from the same raw materials as were used in the previous examples but in different proportions. For comparison, similar data for isostatically formed, and conventionally processed brick are shown.

TABLE VII

| | Predensifying Process | Isostatic Process | Conventional Dry Press Process | Predensifying Process | Isostatic Process | Conventional Dry Press |
|---|---|---|---|---|---|---|
| Nominal composition, MgO % | 30 | 30 | 30 | 80 | 80 | 80 |
| Bulk density, pcf | 212 | 218 | 204 | 202 | 198 | 182 |
| Apparent porosity, % | 13.9 | 10.4 | 15.4 | 10.2 | 12.0 | 19.2 |
| Apparent Sp. Gravity | 3.93 | 3.91 | 3.88 | 3.60 | 3.60 | 3.61 |
| Modulus of rupture, psi | 2125 | ND | 1615 | 3685 | ND | 900 |
| Chemical Analysis | | | | | | |
| MgO | 32.4% | 29.9% | 35.0% | 81.8% | 79.7% | 79.3% |
| CaO | 0.37 | 0.36 | 0.49 | 0.60 | 0.59 | 0.58 |
| SiO$_2$ | 2.57 | 2.64 | 2.96 | 1.21 | 1.27 | 1.28 |
| Al$_2$O$_3$ | 24.4 | 25.3 | 22.3 | 6.22 | 6.98 | 7.13 |
| Fe$_2$O$_3$ | 12.1 | 12.5 | 12.7 | 3.15 | 3.52 | 3.60 |
| Cr$_2$O$_3$ | 28.2 | 29.2 | 26.5 | 7.04 | 7.92 | 8.10 |

TABLE VII-continued

|  | Predensifying Process | Isostatic Process | Conventional Dry Press Process | Predensifying Process | Isostatic Process | Conventional Dry Press |
|---|---|---|---|---|---|---|
| Burning Temperature, °F. | 3150° F. | 3175° F. | 3000° F. | 3150° F. | 3175° F. | 3150° F. |

EXAMPLE NO. 8

In brick mixes made with the same agglomerated grain, it is possible to alter the grain size of the addition made to the brick mix with corresponding alterations in the brick properties. This is illustrated by Mixes H and I shown in Table VIII.

Both brick mixes were constituted of 80% of the same agglomerate crushed to 3 mesh and fines. To brick mix H was added 10% each of −65 mesh periclase and −65 mesh chrome ore, while to brick Mix I was added 10% each of −28+65 mesh periclase and chrome ore.

It can be seen that the mix with the −65 mesh additions had a higher manufacturing shrinkage and produced brick with higher bulk density, modulus of rupture and lower apparent porosity, but that the brick made from the mix with the −28+65 mesh additions had slightly better thermal shock resistance.

TABLE VIII

| MgO Content | --- 60% --- | |
|---|---|---|
| Mix: | H | I |
| Agglomerate Mix | | |
| Co-Ball Milled to 5 microns | | |
| Periclase | 50% | 50% |
| Chrome Concentrate | 50 | 50 |
| MgSO₄ (Extra) | 1 | 1 |
| MgCl₂ (Extra) | 1 | 1 |
| Moisture | | |
| (Briquetted at 40,000 psi) | 4 | 4 |
| Brick Mix | | |
| Agglomerate, Crushed, 3 M/F | 80% | 80% |
| Periclase, −28 + 65 mesh | 0 | 10 |
| Periclase, −65 mesh | 10 | 0 |
| Chrome Concentrate, −28 + 65 Mesh | 0 | 10 |
| Chrome Concentrate, −65 Mesh | 10 | 0 |
| Dextrin (Extra) | 2 | 2 |
| Moisture (Extra) | 2 | 2 |
| Firing Temperature | --- 3200° F. --- | |
| Manufacturing Shrinkage | 5.8% | 4.0% |
| Bulk Density, pcf | 206 | 202 |
| Modulus of Rupture, psi | 2030 | 1865 |
| Apparent Porosity, % | 12.2 | 13.8 |
| Apparent Specific Gravity, g/cc | 3.76 | 3.76 |
| Prism Spalling, Cycles to Fail | 5 | 7 |

EXAMPLE NO. 9

This example illustrates the preferred way to add a coarser fraction to the otherwise very fine ingredients to control shrinkage and densification of the brick, and at the same time permit effective and economical utilization of fine grained low silica Philippine chrome concentrates marketed as "Losil". This material is also referred to as 100 mesh concentrates, whereas screen analysis indicates it to be all essentially −65+325 mesh. It should be pointed out that these high purity chrome concentrates could have been substituted for the 10 mesh concentrates in all of the previous examples except Example No. 8 in which a −28+65 mesh chrome concentrate was added to the brick mix. This fraction is not available in the Philippine "Losil" chrome concentrates.

Mix J in Table 9 shows additions of 11% −65 mesh periclase and 9% of Losil chrome ore to the brick mix otherwise consisting of 80% crushed agglomerated grain, whereas in Mix K, the additions of 11% −65 mesh periclase and 9% Losil chrome ore were blended with the co-ball milled periclase and chrome prior to briquetting.

After the briquettes were dried and crushed to 3 mesh and fines, to facilitate pressing, the −10+28 mesh fraction was removed by screening, crushed to pass 28 mesh and fines, and blended back to the 3 mesh and fines.

Mix K brick made by adding −65 mesh material to the briquette mix had a slightly higher manufacturing shrinking and density, lower porosity, and smaller pore size than brick made by the first method. The brick made by the second method had a slightly smoother texture than brick made by the first method.

TABLE IX

| Mix: | J | K |
|---|---|---|
| Agglomerate Mixes | | |
| Periclase, −65 mesh | 0% | 11% |
| "Losil" chrome Conc. | 0 | 9 |
| (100 mesh, as rec'd) | | |
| Co-Ball milled to 4.0 microns | | |
| Periclase | 55 | 44 |
| "Losil" Chrome Conc. | 45 | 36 |
| MgCl₂, Extra | 1 | 1 |
| MgSO₄, Extra | 1 | 1 |
| Moisture, Extra | 4 | 4 |
| (Briquetted at 40,000 psi) | | |
| Brick Mixes | | |
| Agglomerate, 3/10 mesh | 60% | 60% |
| Agglomerate, 28/F | 20 | 40 |
| Periclase, 65/F | 11 | 0 |
| "Losil" Chrome Conc. | 9 | 0 |
| (100 mesh, as rec'd) | | |
| Dextrin, Extra | 2 | 2 |
| Moisture, Extra | 2 | 2 |
| Firing Temperature | --- 3200° F. --- | |
| Agglomerate, Bulk Density, g/cc | 3.00 | 3.06 |
| Manufacturing Shrinkage, % | 5.0 | 5.5 |
| Bulk Density, pcf | 200 | 203 |
| Apparent Porosity, % | 14.7 | 13.1 |
| Apparent Specific Gravity, g/cc | 3.77 | 3.75 |
| Modulus of Rupture, psi | −1955 | 2235 |
| 2700° F. Modulus of Rutpure, psi | 895 | 890 |
| Median Pore Size, microns | 8.7 | 6.2 |

EXAMPLE NO. 10

In Example No. 1, it was demonstrated that the degree of fineness to which the raw materials were ball milled, or the reactivity of the powder as indicated by the mesh size through which 90% of a sample of the ball mill discharge passed, determined the level of properties obtained; i.e., with finer grain size higher densities and lower porosities were obtained.

This example illustrates the use of the Fisher Sub-Sieve Sizer to determine the average grain size in microns of the ball mill discharge. It also demonstrates that the average grain size as indicated by the Fisher Sub-Sieve Sizer is related to the properties similar to the mesh size as demonstrated in the first example. Measurement of grain size of fine powders by the Fisher Sub-Sieve Sizer is advantageous because it has been found to be more rapid and reproducible than with screens which are difficult to use when much of the powder is smaller than the openings of a 325 mesh sieve.

Periclase and "Losil" chrome concentrates were co-ball milled to average micron sizes of 7.7, 4.8, and 2.45, as measured by the Fisher Sub-Sieve Sizer. To the ball milled powders in each mix was added 11% −65 mesh periclase and 9% "Losil" chrome grain sized as received.

Brick were made using the same method as described for Mix K of Example 9.

With decreasing grain size, the brick underwent greater shrinkage on firing, increased in bulk density and strength while decreasing in apparent porosity. Mix N displayed some surface crazing.

TABLE X

| Mix: | L | M | N |
|---|---|---|---|
| Agglomerate Mixes | | | |
| Periclase, 65/F | 11% | 11% | 11% |
| "Losil" Chrome Conc. (100 mesh, as rec'd) | 9 | 9 | 9 |
| Co-Ball Milled to, microns | 7.7 | 4.8 | 2.45 |
| Periclase | 44% | 44% | 44% |
| "Losil" Chrome Conc. | 36 | 36 | 36 |
| $MgCl_2$, Extra | 1 | 1 | 1 |
| $MgSO_4$, Extra | 1 | 1 | 1 |
| Moisture, Extra | 4 | 4 | 4 |
| (Briquetted at 40,000 psi) | | | |
| Brick Mixes | | | |
| Agglomerate, 3/10 mesh | 60% | 60% | 60% |
| Agglomerate, 28/F | 40 | 40 | 40 |
| Dextrin, Extra | 2 | 2 | 2 |
| Moisture, Extra | 2 | 2 | 2 |
| Firing Temperature | - - - 3200° F. - - - | | |
| Manufacturing Shrinkage, % | 4.0 | 5.9 | 7.3 |
| Bulk Density, pcf | 194 | 203 | 211 |
| Apparent Porosity, % | 17.1 | 13.7 | 10.2 |
| Apparent Specific Gravity, g/cc | 3.75 | 3.77 | 3.76 |
| Modulus of Rupture, psi | 1995 | 2365 | 2570 |
| 2700° F. Modulus, psi | 825 | 845 | 1000 |
| Median Pore Size, microns | 8.8 | 5.1 | 6.8 |

EXAMPLE NO. 11

To ascertain the commercial viability of the invention, 150 brick were made on a pilot plant scale for installation in a test panel in a vessel used for refining molten stainless steel by a method known as argon-oxygen-decarburization. The brick were made with the same raw materials and by the same method described in Example 10 shown in Table X with the exception that the ball milled fraction was co-ball milled to an average 3.5 microns Fisher sub-sieve size. The brick were pressed at a pressure of approximately 5,500 psi into key shaped brick so that after firing they would have specified dimensions. In addition to the 150 brick installed in the argon-oxygen-decarburization vessel, additional brick from the same lots were tested for properties. These are shown in Table XI.

The 150 brick were installed in the most severe wear areas of the vessel and at the end of the test, the brick were judged to have withstood wear by corrosion better than the conventional direct bonded basic brick against which they were compared.

TABLE XI

| Size of Fired Brick | 13½" × (6-5)" × 3" | 13½" × (6-3)" × 3" |
|---|---|---|
| Manufacturing Shrinkage, % | 6.0 | 6.2 |
| Bulk Density, pcf | 207 | 208 |
| Apparent Porosity, % | 11.4 | 10.7 |
| Apparent Specific Gravity | 3.75 | 3.73 |
| Modulus of Rupture, psi | 3525 | 3370 |
| 2700° F. Hot Modulus of Rupture, psi | 1915 | 2050 |
| Chemical Analysis Calculated from Analyses of Raw Materials | | |
| Magnesia (MgO) | 62.01% | |
| Lime (CaO) | 0.48 | |
| Silica ($SiO_2$) | 1.33 | |
| Alumina ($Al_2O_3$) | 13.13 | |
| Iron Oxide ($Fe_2O_3$) | 7.35 | |
| Chromic Oxide ($Cr_2O_3$) | 15.71 | |

This invention is intended to cover all changes and modifications of the example of the invention herein chosen for purposes of the disclosure which do not constitute departures from the spirit and scope of the invention.

What is claimed:

1. A process for producing a basic refractory brick or other refractory product, said process comprising the steps of preparing a fine grain refractory material consisting of a mixture of chrome ore and high purity periclase, said refractory being capable of passing a 65 mesh screen, tempering the refractory material with a solution containing magnesium chloride and/or magnesium sulfate, pressure-forming the tempered refractory material into larger size agglomerated, predensified and unsintered pieces, drying the agglomerated pieces at a temperature below the sintering temperature of the refractory material, crushing the agglomerated pieces to provide predensified unsintered grains, sizing the predensified unsintered grains into a suitable mix for pressing to a shape, moistening the mix, pressing the mix into objects of a desired refractory shape, drying the shaped objects, and firing the shaped objects at a temperature of at least 3000° F. to yield refractory products having said desired shape.

2. The process according to claim 1 wherein 70–100 parts by weight of the mix comprises larger size agglomerated pieces consisting of fine grain refractory material capable of passing a 325 mesh screen with an average size of 2 to 5 microns and 0 to 30 parts of the mix comprises refractory materials capable of passing a 65 mesh screen.

3. The process according to claim 1 wherein the agglomerated pieces are dried at a temperature between 300° F. and 800° F. prior to being crushed.

4. The process according to claim 1 wherein the fine grain refractory material is formed into larger size agglomerated pieces in the shape of briquettes.

5. A process for producing a refractory brick or other refractory product, said process comprising the steps of preparing a fine grain refractory material consisting essentially of a mixture of magnesite and chromite capable of passing a 65 mesh screen, tempering the refractory material with a solution containing magnesium chloride and/or magnesium sulfate to chemically bond the individual grains, pressure-forming the tempered refractory material into larger size agglomerated, predensified, and unsintered pieces, drying the agglomerated pieces at a temperature below the sintering temperature thereof, crushing the agglomerated pieces to provide predensified unsintered grains, sizing the predensified unsintered grains into a suitable mix for pressing to a shape, moistening the mix without significant hydration of the magnesium oxide, pressing the mix into a desired refractory shape, and firing the pressed shape at a temperature of at least 3000° F. to yield a refractory product having said desired shape.

6. A process for producing a refractory brick or other refractory product, said process comprising the steps of preparing a fine grain refractory material capable of passing a 65 mesh screen, tempering the refractory material with a chemical bonding solution, forming the tempering refractory material into larger size agglomerated pieces, drying the agglomerated pieces so as to form the chemical bond, crushing the agglomerated pieces, sizing the crushed pieces into a suitable mix for pressing to a shape, moistening the mix, pressing the mix into a desired refractory shape, and firing the pressed shape in a suitable atmosphere and at a temperature sufficient to form a ceramic bond and yield a refractory product having said desired shape.

* * * * *